US012482626B2

(12) United States Patent
Canazon

(10) Patent No.: US 12,482,626 B2
(45) Date of Patent: Nov. 25, 2025

(54) X-RAY TUBE WITH CORRUGATED WALL

(71) Applicant: John Canazon, Lawrenceville, GA (US)

(72) Inventor: John Canazon, Lawrenceville, GA (US)

( * ) Notice: Subject to any disclaimer, the term of this patent is extended or adjusted under 35 U.S.C. 154(b) by 0 days.

(21) Appl. No.: 18/277,909

(22) PCT Filed: Aug. 15, 2023

(86) PCT No.: PCT/US2023/030264
§ 371 (c)(1),
(2) Date: Aug. 18, 2023

(87) PCT Pub. No.: WO2024/039669
PCT Pub. Date: Feb. 22, 2024

(65) Prior Publication Data

US 2025/0079109 A1 Mar. 6, 2025

Related U.S. Application Data

(60) Provisional application No. 63/399,429, filed on Aug. 19, 2022.

(51) Int. Cl.
*H01J 35/16* (2006.01)
*H01J 35/08* (2006.01)
*H01J 35/12* (2006.01)

(52) U.S. Cl.
CPC ............. *H01J 35/16* (2013.01); *H01J 35/116* (2019.05); *H01J 35/13* (2019.05); *H01J 2235/1216* (2013.01)

(58) Field of Classification Search
CPC .......... H01J 35/16; H01J 35/116; H01J 35/13; H01J 2235/1216
See application file for complete search history.

(56) References Cited

U.S. PATENT DOCUMENTS 6,430,263 B1 * 8/2002 Lu .......................... H05G 1/025 378/127
2011/0038462 A1 * 2/2011 Davies ..................... H05G 1/04 378/140

(Continued)

FOREIGN PATENT DOCUMENTS

GB 850312 A * 10/1960 .............. H01J 35/02

OTHER PUBLICATIONS

WO 2014/038038 A1 and its English translation (Year: 2014).*

*Primary Examiner* — Chih-Cheng Kao
(74) *Attorney, Agent, or Firm* — Bryan W. Bockhop; Bockhop Intellectual Property Law, LLC

(57) ABSTRACT

An x-ray tube includes an inner wall including a target surface and an outer wall disposed about the inner wall and defining a gap therebetween. A corrugated structure is disposed in the gap and is coupled to both the inner wall and the outer wall so as to define a plurality of channels therebetween. The corrugated structure is configured to allow a coolant to flow through the channels. An area inside of the inner wall is substantially maintained at a vacuum and a filament is disposed in the area inside of the inner wall. When a sufficient voltage is applied between the filament and the inner wall, the filament emits electrons directed to at least a portion of the target surface so that the target surface emits electrons.

14 Claims, 3 Drawing Sheets

(56) References Cited

U.S. PATENT DOCUMENTS

| | | | | |
|---|---|---|---|---|
| 2013/0292098 | A1* | 11/2013 | Jindou | F28F 17/005 165/151 |
| 2014/0126702 | A1* | 5/2014 | Haag | H01J 35/13 378/140 |
| 2015/0380201 | A1* | 12/2015 | Yoshizawa | H01J 35/305 378/125 |
| 2022/0285120 | A1* | 9/2022 | Swanson | H01J 35/13 |

* cited by examiner

X-RAY TUBE WITH CORRUGATED WALL

BACKGROUND OF THE INVENTION

1. Field of the Invention

The present invention relates to x-ray tubes and, more specifically, to an x-ray tube with a corrugated wall.

2. Description of the Related Art

X-rays are used in a variety of applications such as imaging and product irradiation. Imaging applications include producing x-rays for computer aided tomography (CAT) scans. Irradiation applications include producing x-rays used to sterilize packaged food and other products. Imaging applications tend to require relatively less x-ray power than do high throughput irradiation applications.

Existing x-ray tubes include a hot or cold cathode, a filament (such as a tungsten filament in hot cathode embodiments) that is electrically coupled to the cathode, an anode that is spaced away from the filament and a target (such as a gold or tungsten target). In some embodiments, the anode also acts as the target. Certain x-ray tubes employ a very pointy cathode, without a separate filament, to generate electrons. Such cathodes are referred to as "cold cathodes." The space between the cathode and the anode is substantially a vacuum. With sufficient voltage applied between the cathode and the anode, then the cathode (either cold or hot) will emit electrons which are accelerated toward the anode and strike the target, thereby generating x-rays.

The impingement of the electrons on the target generates heat. Any given x-ray power output from a single cathode will result in the generation of a certain amount of heat at this single location. Because of this, many x-ray tubes use a cooling system through which flows a coolant (which in certain embodiments could include water, a hydrocarbon, a fluorocarbon, an oil, etc.) to carry off heat or a rotary anode target. The tube is limited to a maximum x-ray output by the maximum amount of heat that can be concentrated at the single location on the target given the efficiency of the cooling system. Excessive heat can lead to the destruction of the anode as well as a loss of vacuum, leading to high voltage arcs.

Many x-ray tubes include a tube of aluminum with a hemispherical end in which a vacuum is maintained. The arrangement of the cathode and the anode is configured so that x-rays generated from the target tend to exit from a specific portion of the tube. Because the tube is maintained under vacuum and generally has a convex shape, the walls of the tube have to be relatively thick to prevent deformation of the tube. However, attenuation of x-rays exiting the tube increases as a function of the thickness of the tube where the x-rays exit. High attenuation results in increased cost of the tube.

Therefore, there is a need for an x-ray tube with thin walls that minimize x-ray attenuation.

SUMMARY OF THE INVENTION

The disadvantages of the prior art are overcome by the present invention which, in one aspect, is an x-ray tube includes an inner wall including a target surface and an outer wall disposed about the inner wall and defining a gap therebetween. A corrugated structure is disposed in the gap and is coupled to both the inner wall and the outer wall so as to define a plurality of channels therebetween. The corrugated structure is configured to allow a coolant to flow through the channels. An area inside of the inner wall is substantially maintained at a vacuum and a filament is disposed in the area inside of the inner wall. When a sufficient voltage is applied between the filament and the inner wall, the filament emits electrons directed to at least a portion of the target surface so that the target surface emits electrons.

In another aspect, the invention is an x-ray tube that includes an inner wall including a target surface and an outer wall disposed about the inner wall and defining a gap therebetween. A corrugated structure is disposed in the gap and is coupled to at least one of the inner wall and the outer wall so as to define a plurality of channels therebetween. The channels are configured to allow a coolant to flow through the channels. The corrugated structure includes a rectangular crenulated pattern that includes a repetition of: an inner flat surface having a first end and an opposite second end, the inner flat surface being affixed to the inner wall; an outer flat surface laterally offset from the inner flat surface having a first end and an opposite second end, the outer flat surface being affixed to the outer wall; a first transverse surface that couples the second end of the inner flat surface to the first end of the outer flat surface; and a second transverse surface that couples the second end of the outer flat surface to the first end of a successive inner flat surface. An area inside of the inner wall is substantially maintained at a vacuum. A filament is disposed in the area inside of the inner wall. When a sufficient voltage is applied between the filament and the inner wall, the filament will emit electrons directed to at least a portion of the target surface so that the target surface emits x-rays.

These and other aspects of the invention will become apparent from the following description of the preferred embodiments taken in conjunction with the following drawings. As would be obvious to one skilled in the art, many variations and modifications of the invention may be effected without departing from the spirit and scope of the novel concepts of the disclosure.

DETAILED DESCRIPTION OF THE INVENTION

Figure 1:
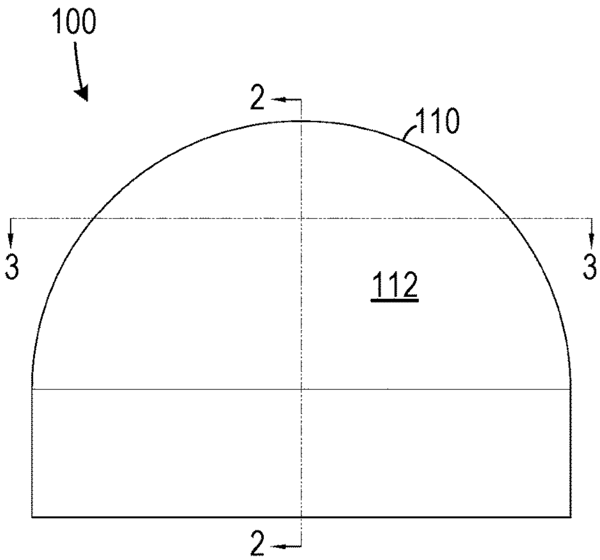
FIG. 1 is a schematic diagram of a portion of an x-ray tube.

A preferred embodiment of the invention is now described in detail. Referring to the drawings, like numbers indicate like parts throughout the views. Unless otherwise specifically indicated in the disclosure that follows, the drawings are not necessarily drawn to scale. The present disclosure should in no way be limited to the exemplary implementations and techniques illustrated in the drawings and described below. As used in the description herein and throughout the claims, the following terms take the meanings explicitly associated herein, unless the context clearly dictates otherwise: the meaning of "a," "an," and "the" includes plural reference, the meaning of "in" includes "in" and "on."

Figure 2:
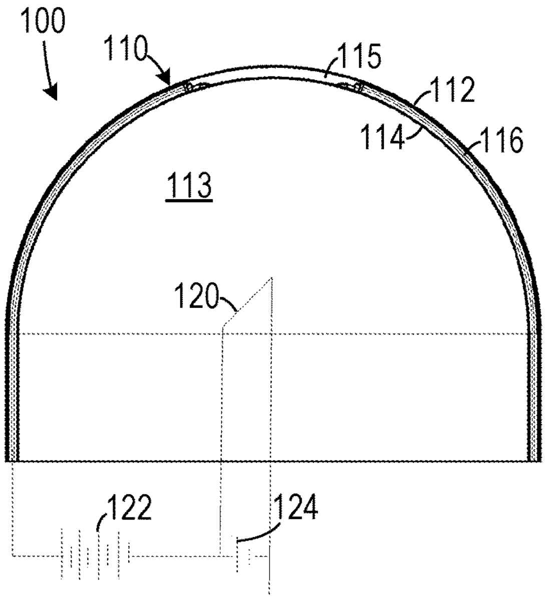
FIG. 2 is a cross section of the tube shown in FIG. 1, taken along line 2-2.
Figure 3:
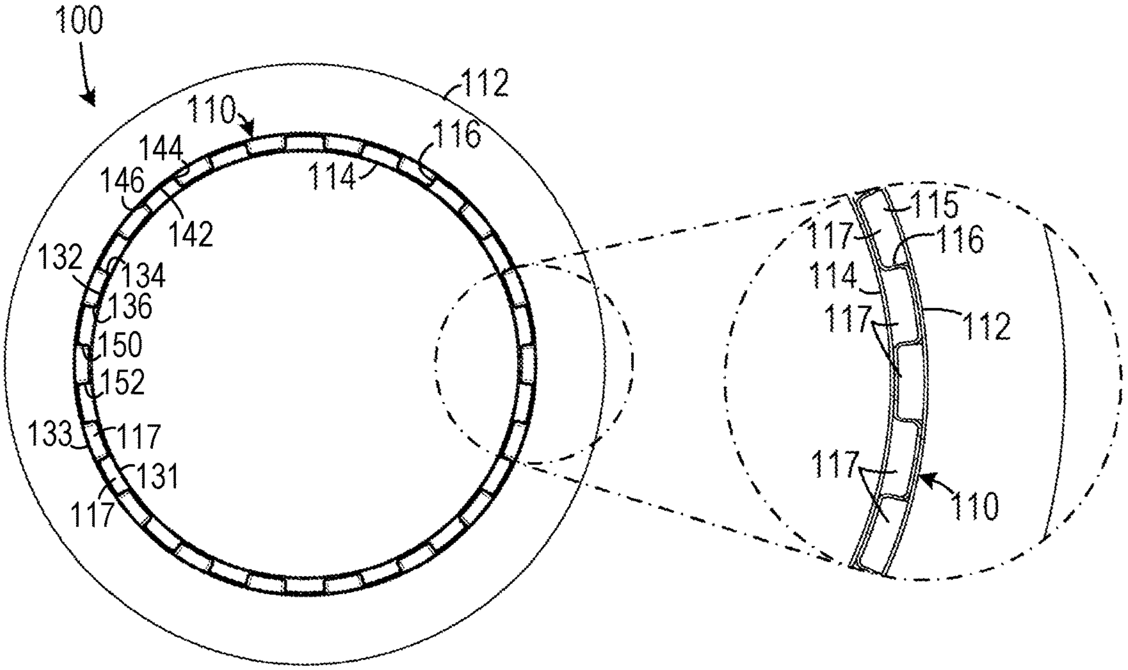
FIG. 3 is a cross section of the tube shown in FIG. 1, taken along line 3-3, along with at detail thereof.

As shown in FIGS. 1-3, one embodiment of an x-ray tube 100 includes a composite wall 110 having an outer wall 112 and an inner wall 114 that define a gap 115 therebetween. A filament 120 is disposed inside 113 the inner wall 114, which acts as an anode. The inside 113 is maintained at a near-vacuum pressure. The filament 120, which acts as a cathode, can be heated by applying a first voltage from a first voltage source 124 so that when a second voltage source applies a sufficient voltage between the inner wall 114 and the filament 120, the filament will emit electrons that are propelled toward the inner wall 114. The inner wall 114 includes a material, such as tungsten, that acts as a target for electrons being emitted by the filament and that emits x-rays when electrons strike it. The outer wall 112 includes a material, such as aluminum, that is substantially transparent to the x-rays being emitted from the target.

A corrugated structure 116 is disposed in at least a portion of the gap 115 and is coupled to both the outer wall 112 and the inner wall 114 so as to define a plurality of channels 117 through which a coolant (e.g., water, oil or other coolant) flows. The corrugated structure 116 and the walls form a truss-like structure that distributes force from outside air pressure on the outer wall 112. The corrugated structure 116 can include a material that is transparent to x-rays, such as aluminum or certain ceramics.

The truss-like aspect of the corrugated structure 116 allows the outer wall 112 and the inner wall 114 to be thinner that similar walls in conventional x-ray tubes. The use of thinner walls results in less attenuation of the x-rays exiting the tube 100.

In this embodiment, an inner flat surface 132 includes a repeating crenulated pattern in which each unit cell of the pattern has a first end 134 and an opposite second end 136. The inner flat surface 132 is affixed to the inner wall 131. Each outer flat surface 142 is laterally offset from the adjacent inner flat surface 132 and has a first end 144 and an opposite second end 146. The outer flat surface 142 is affixed to the outer wall 133. A first transverse surface 150 couples the second end 136 of the inner flat surface 132 to the first end 144 of the outer flat surface 142. The second transverse surface 152 couples the second end 146 of the outer flat surface 142 to the first end 134 of a successive inner flat surface 132.

In one embodiment, the x-ray tube uses a combination water jacket/anode target that utilizes two or more layers. One side of the corrugated sandwich is the target exposed to a vacuum. Coolant flows through the center of layers cooling the back side of the anode. The advantage of the corrugated assembly it to give the tube improved structural rigidity with thinner walls. This reduces x-ray attenuation and improves cooling efficiency.

In one embodiment, the corrugated water jacket/anode target can be convex (e.g., spherical, hemispherical, tubular, toroidal, etc.), flat, concave, coned, or it can have other complex geometries to form a whole or partial vacuum vessel.

The corrugation allows the water jacket and anode walls to be very thin yet ridged so as to reduce the attenuation of x-ray photons. Also the link from the outside to the inside wall reduces the effect of the water pressure on the Anode vacuum wall, thereby preventing it from collapsing. Many different corrugation patterns can improve structural integrity and provide efficient cooling. Also, many other geometric shapes can utilize this type of corrugated anode/water jacket. One embodiment can employ a cylinder or cube with concave sides.

Figure 4:
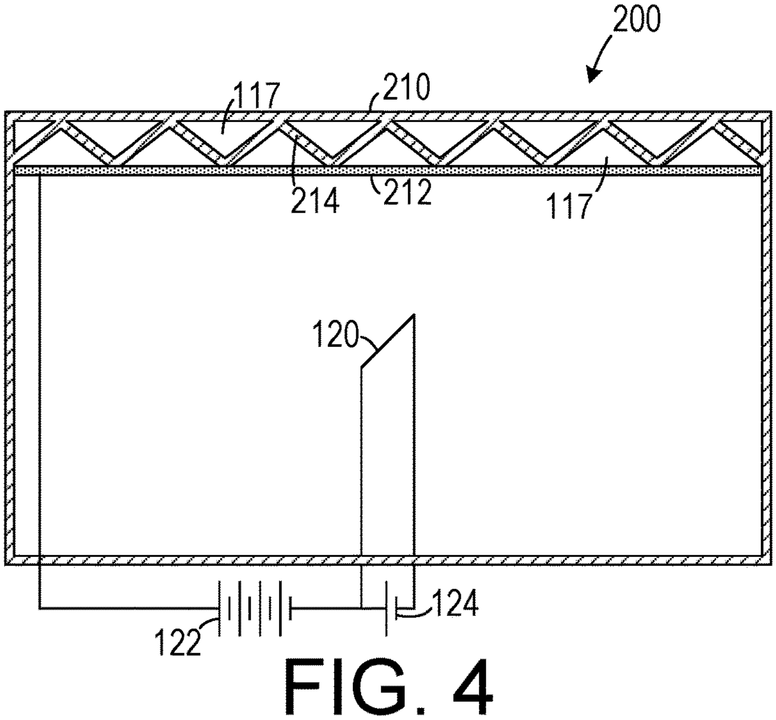
FIG. 4 is a schematic diagram of an x-ray tube with a triangular truss-like structure.

As shown in FIG. 4, an x-ray generating tube 200 can include a target 212 coupled to a triangular truss structure 214 that is part of the outer casing to the tube 200. In this embodiment, the inner wall of the tube is made of target material so that the target 212 serves as the inner wall of the tube 200.

Figure 5:
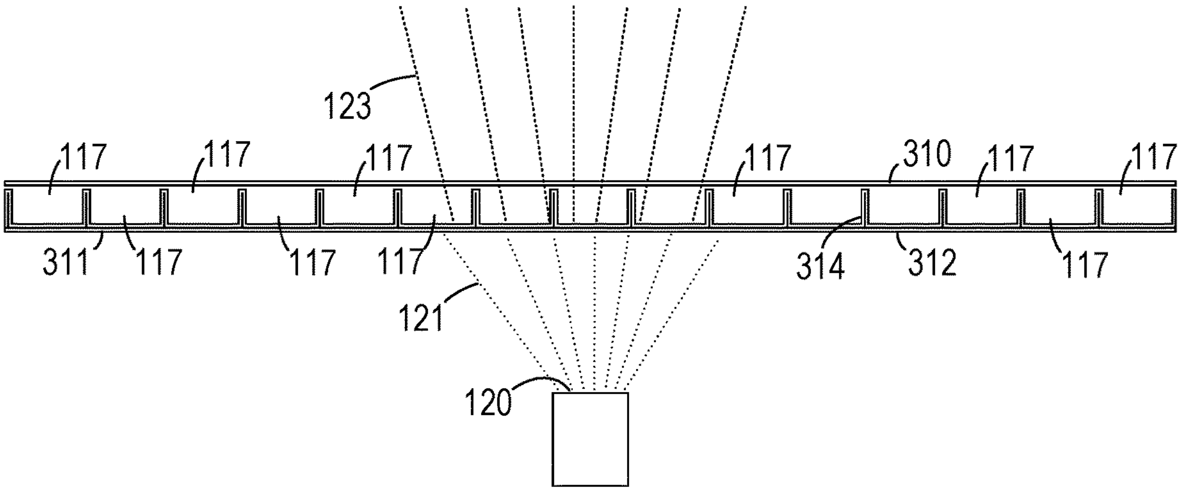
FIG. 5 is a schematic diagram of an x-ray tube with vertical truss-like structure.

As shown in FIG. 5, the anode/target 312 can be co-extensive with a repetitive U-shaped window/corrugated structure 314 to form the inner wall. The window/corrugated structure 314 can be detached or partially detached from the outer wall 310 or the inner wall 311 to facilitate coolant flow. The structural parts of the corrugated structures can include many different materials (such as aluminum, plastic and certain ceramics), depending upon the specific application. The corrugated structures can be formed through a casting process, a machining process, a lithographic process or one of the many know ways of fabricating such structures. The corrugations can be attached to the walls using adhesives, brazing, spot welding or one of the many know ways of affixing structures to each other. Preferably, the ribs of the corrugated structures are made from materials that exhibit extremely low attenuation of x-rays. The filament 120 emits electrons, which strike the target 312, causing the target 312 to emit x-rays 123. (In the embodiment shown, the inner wall 311 also serves as the target 312. In certain embodiments, they may also be separate structures.)

Figure 6:
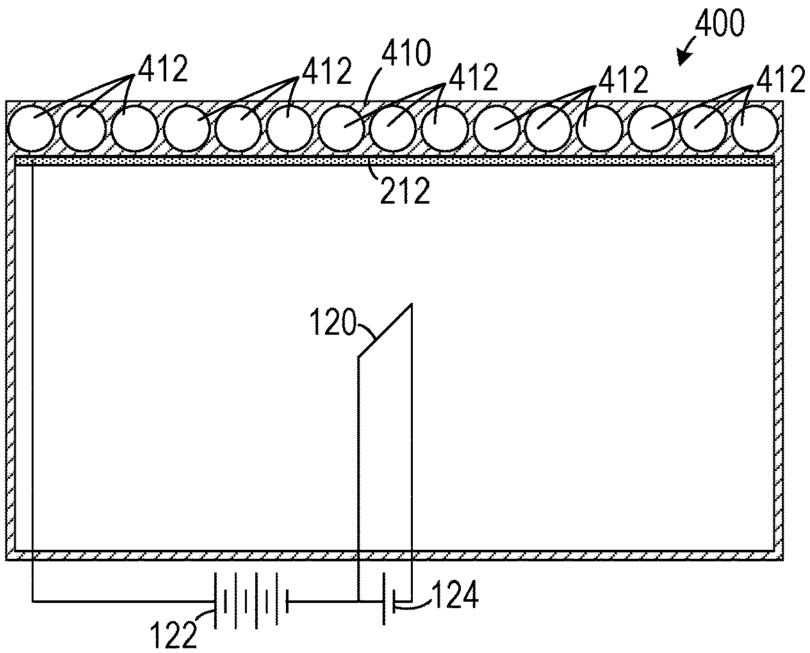
FIG. 6 is a schematic diagram of an x-ray tube with a circular cooling channel structure.

As shown in FIG. 6, one embodiment of an x-ray tube 400 includes an outer wall 410 that defines a plurality of tubular passages 412 passing therethrough that act as cooling channels.

Figure 7:
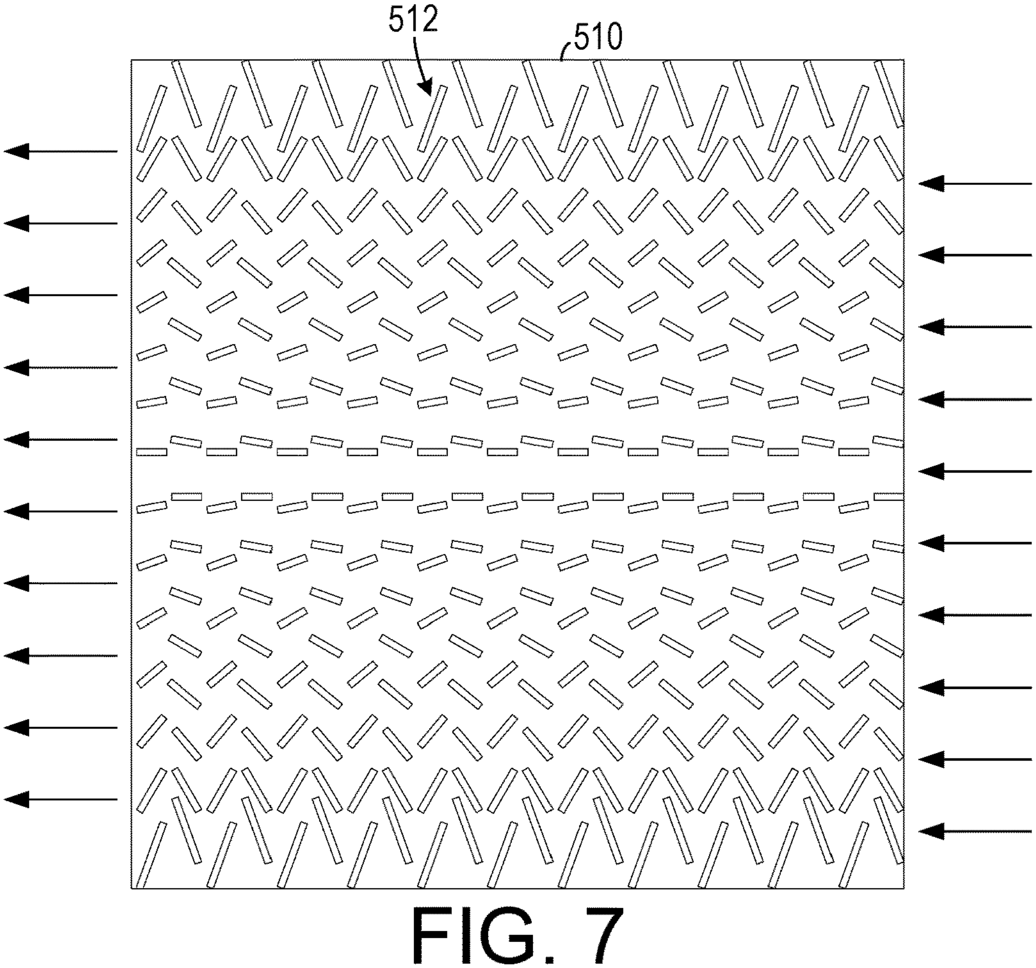
FIG. 7 is a schematic diagram of ar cooling channel structure with corrugations of varying pitch.

As shown in FIG. 7, the corrugations 512 in the cooling jacket 510 can have varying geometries (e.g., a "herringbone geometry") to increase coolant flow rate in certain regions where the target generates higher amounts of heat (e.g., in a region with the highest concentration of electrons impinging thereon) and to decrease coolant flow rate in regions where the target generates lower amounts of heat. Thus, the coolant can flow at different rates depending on where in the geometry it is flowing. The geometry will allow coolant to flow faster in areas of higher heat generation and slower in areas of lower heat generation.

The corrugations of the present invention stiffen the walls, thereby allowing the inner wall and the outer wall to be made thinner than would otherwise be necessary for structural integrity, which results in less attenuation of the x-rays. Also, the corrugations can be configured to cause turbulent flow of the coolant, which can result in more efficient cooling.

Although specific advantages have been enumerated above, various embodiments may include some, none, or all of the enumerated advantages. Other technical advantages may become readily apparent to one of ordinary skill in the art after review of the following figures and description. It is understood that, although exemplary embodiments are illustrated in the figures and described below, the principles of the present disclosure may be implemented using any number of techniques, whether currently known or not. Modifications, additions, or omissions may be made to the systems, apparatuses, and methods described herein without departing from the scope of the invention. The components of the systems and apparatuses may be integrated or separated. The operations of the systems and apparatuses disclosed herein may be performed by more, fewer, or other components and the methods described may include more, fewer, or other steps. Additionally, steps may be performed in any suitable order. As used in this document, "each" refers to each member of a set or each member of a subset of a set. It is intended that the claims and claim elements recited below do not invoke 35 U.S.C. § 112(f) unless the words "means for" or "step for" are explicitly used in the particular claim. The above-described embodiments, while including the preferred embodiment and the best mode of the invention known to the inventor at the time of filing, are given as illustrative examples only. It will be readily appreciated that many deviations may be made from the specific embodiments disclosed in this specification without departing from the spirit and scope of the invention. Accordingly, the scope of the invention is to be determined by the claims below rather than being limited to the specifically described embodiments above.

What is claimed is:

1. An x-ray tube, comprising:

(a) an inner wall including a target surface;

(b) an outer wall disposed about the inner wall and defining a gap therebetween;

(c) a corrugated structure disposed in the gap and coupled to at least one of the inner wall and the outer wall so as to define a plurality of channels therebetween, wherein the channels are configured to allow a coolant to flow through the channels, the inner wall, the outer wall and the corrugated structure forming a wall stiffening truss-like structure that is structurally rigid and that distributes force from outside air pressure on the outer wall;

(d) a volume inside of the inner wall that is substantially maintained at a vacuum; and (e) a filament disposed in the area inside of the inner wall; wherein when a sufficient voltage is applied between the filament and the inner wall, the filament will emit electrons directed to at least a portion of the target surface so that the target surface emits x-rays.

2. The x-ray tube of claim 1, wherein the corrugated structure includes a rectangular pattern that includes a repetition of:

(a) an inner flat surface having a first end and an opposite second end, the inner flat surface being affixed to the inner wall;

(b) an outer flat surface laterally offset from the inner flat surface having a first end and an opposite second end, the outer flat surface being affixed to the outer wall;

(c) a first transverse surface that couples the second end of the inner flat surface to the first end of the outer flat surface; and (d) a second transverse surface that couples the second end of the outer flat surface to the first end of a successive inner flat surface.

3. The x-ray tube of claim 1, wherein the corrugated structure comprises a repeating crenulated pattern.

4. The x-ray tube of claim 1, wherein the corrugated structure includes a repetitive triangular truss structure.

5. The x-ray tube of claim 1, wherein the corrugated structure includes a repetitive U-shaped structure.

6. The x-ray tube of claim 1, wherein the corrugated structure includes a solid outer wall defining a plurality of tubular passages running therethrough.

7. The x-ray tube of claim 1, wherein the corrugated structure includes a varying geometry that causes the coolant to flow at different rates depending on where in the varying geometry the coolant is flowing through.

8. The x-ray tube of claim 1, wherein the coolant comprises water.

9. The x-ray tube of claim 1, wherein the area inside of the inner wall comprises tungsten.

10. The x-ray tube of claim 1, wherein the outer wall comprises aluminum.

11. An x-ray tube, comprising:

(a) an inner wall including a target surface;

(b) an outer wall disposed about the inner wall and defining a gap therebetween;

(c) a corrugated structure disposed in the gap and coupled to at least one of the inner wall and the outer wall so as to define a plurality of channels therebetween, the inner wall, the outer wall and the corrugated structure forming a wall stiffening truss-like structure that is structurally rigid and that distributes force from outside air pressure on the outer wall, wherein the channels are configured to allow a coolant to flow through the channels, the corrugated structure including a rectangular crenulated pattern that includes a repetition of:

(i) an inner flat surface having a first end and an opposite second end, the inner flat surface being affixed to the inner wall;

(ii) an outer flat surface laterally offset from the inner flat surface having a first end and an opposite second end, the outer flat surface being affixed to the outer wall;

(iii) a first transverse surface that couples the second end of the inner flat surface to the first end of the outer flat surface; and (iv) a second transverse surface that couples the second end of the outer flat surface to the first end of a successive inner flat surface;

(d) an area inside of the inner wall that is substantially maintained at a vacuum; and (e) a filament disposed in the area inside of the inner wall, wherein when a sufficient voltage is applied between the filament and the inner wall, the filament will emit electrons directed to at least a portion of the target surface so that the target surface emits x-rays.

12. The x-ray tube of claim 11, wherein the coolant comprises water.

13. The x-ray tube of claim 11, wherein the area inside of the inner wall comprises tungsten.

14. The x-ray tube of claim 11, wherein the outer wall comprises aluminum.

* * * * *